(12) United States Patent
Kanj et al.

(10) Patent No.: US 12,479,355 B2
(45) Date of Patent: Nov. 25, 2025

(54) METHOD FOR CONTROLLING A LIGHT PATTERN AND AUTOMOTIVE LIGHTING DEVICE

(71) Applicant: VALEO VISION, Bobigny (FR)

(72) Inventors: Ali Kanj, Bobigny (FR); Constantin Prat, Bobigny (FR); Matthieu Drezet, Bobigny (FR); Hafid El Idrissi, Bobigny (FR)

(73) Assignee: Valeo Vision, Bobigny (FR)

( * ) Notice: Subject to any disclaimer, the term of this patent is extended or adjusted under 35 U.S.C. 154(b) by 140 days.

(21) Appl. No.: 18/552,700

(22) PCT Filed: Mar. 28, 2022

(86) PCT No.: PCT/EP2022/058181
§ 371 (c)(1),
(2) Date: Sep. 27, 2023

(87) PCT Pub. No.: WO2022/207581
PCT Pub. Date: Oct. 6, 2022

(65) Prior Publication Data
US 2024/0157868 A1    May 16, 2024

(30) Foreign Application Priority Data
Mar. 29, 2021  (FR) ...................................... 2103224

(51) Int. Cl.
*B60Q 1/14*    (2006.01)
*F21S 41/153*  (2018.01)
(Continued)

(52) U.S. Cl.
CPC ............ *B60Q 1/143* (2013.01); *F21S 41/153* (2018.01); *F21S 41/663* (2018.01);
(Continued)

(58) Field of Classification Search
CPC .............. B60Q 1/143; B60Q 2300/054; B60Q 2300/322; B60Q 1/122; F21S 41/153; F21S 41/663; F21S 41/60; F21W 2102/19
See application file for complete search history.

(56) References Cited

U.S. PATENT DOCUMENTS

| 4,985,816 A | 1/1991 | Seko et al. |
| 10,293,740 B2 | 5/2019 | Langkabel et al. |

(Continued)

FOREIGN PATENT DOCUMENTS

| CN | 113195306 A | 7/2021 |
| DE | 102017129254 A1 | 7/2018 |

(Continued)

OTHER PUBLICATIONS

European Patent Office, International Search Report and Written Opinion for corresponding International Application No. PCT/EP2022/058181 dated Jun. 27, 2022.

(Continued)

*Primary Examiner* — Abdullah A Riyami
*Assistant Examiner* — Syed M Kaiser
(74) *Attorney, Agent, or Firm* — Valeo Vision

(57) ABSTRACT

The invention provides a method for controlling a light pattern provided by an automotive lighting device of an automotive vehicle. The method includes providing a road profile, extracting road features from the road profile, dividing the matrix arrangement in row groups, assigning a different shifting value for each row group, each shifting value depending on the road features, dividing each row group in a first portion and a second portion, shifting the operation of the first portion of each row group of light sources according to the corresponding shifting value and create a third portion between the shifted first portion and the second portion of each row group.

13 Claims, 4 Drawing Sheets

(51) Int. Cl.
*F21S 41/663* (2018.01)
*F21W 102/19* (2018.01)

(52) U.S. Cl.
CPC .. *B60Q 2300/054* (2013.01); *B60Q 2300/322* (2013.01); *F21W 2102/19* (2018.01)

(56) References Cited

U.S. PATENT DOCUMENTS

| | | | |
|---|---|---|---|
| 11,092,303 | B2 | 8/2021 | Park et al. |
| 11,505,112 | B2* | 11/2022 | Kanj ..................... F21S 41/141 |
| 2010/0322476 | A1* | 12/2010 | Kanhere .............. G06V 10/763 |
| | | | 382/103 |
| 2019/0315266 | A1 | 10/2019 | Kubitza et al. |
| 2020/0258381 | A1* | 8/2020 | Fowe ........................ G06N 7/01 |
| 2022/0055525 | A1* | 2/2022 | Kanj ..................... F21S 41/675 |
| 2022/0306116 | A1* | 9/2022 | Hashimoto ..... B60W 30/18163 |
| 2022/0306162 | A1* | 9/2022 | Kawano ............ B60W 60/0053 |

FOREIGN PATENT DOCUMENTS

| | | | | |
|---|---|---|---|---|
| EP | 3670263 | A1 * | 6/2020 | ............... B60Q 1/12 |
| JP | 2020192823 | A | 12/2020 | |
| WO | WO-2017214648 | A1 * | 12/2017 | ............. B60Q 1/085 |
| WO | 2020126399 | A1 | 6/2020 | |

OTHER PUBLICATIONS

Japan Patent Office, Office Action (including English translation) of corresponding Japanese Application No. 2023-560205, dated Oct. 11, 2024.

Japan Patent Office, Search Report (including English translation) of corresponding Japanese Application No. 2023-560205, dated Oct. 11, 2024.

* cited by examiner

| 0 | 0 | 0 | 0 | 0 | 0 | 0 | 0 | 0 | 0 | 0.5 | 1 | 1.5 | 2 | 2.5 | 3 | 6 | 9 |
|---|---|---|---|---|---|---|---|---|---|---|---|---|---|---|---|---|---|
| 0 | 0 | 0 | 0 | 0 | 0 | 0 | 0 | 0 | 1 | 2 | 3 | 4 | 5 | 6 | 9 | 10 | 10 |
| 0 | 0 | 0 | 0 | 0 | 0 | 0 | 0 | 1 | 2 | 3 | 4 | 8 | 10 | 10 | 10 | 10 | 10 |
| 0 | 0 | 0 | 0 | 0 | 0 | 0 | 1.3 | 2.7 | 4 | 8 | 10 | 10 | 10 | 10 | 10 | 10 | 10 |
| 0 | 0 | 1 | 2 | 3 | 3 | 3.5 | 4 | 8 | 10 | 10 | 10 | 10 | 10 | 10 | 10 | 10 | 8 |
Fig. 8
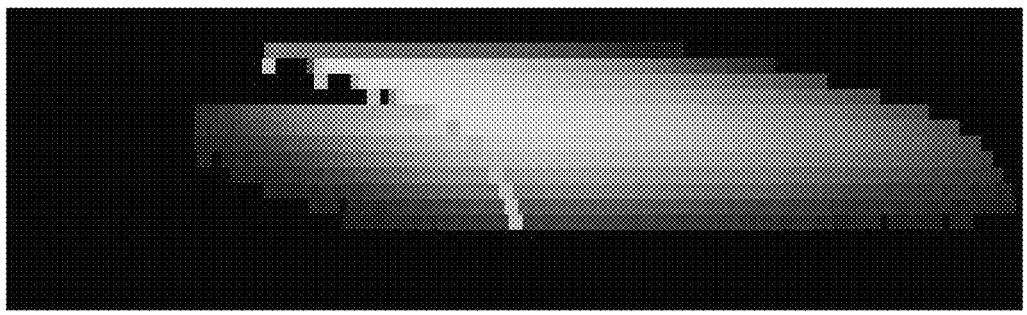
Fig. 9
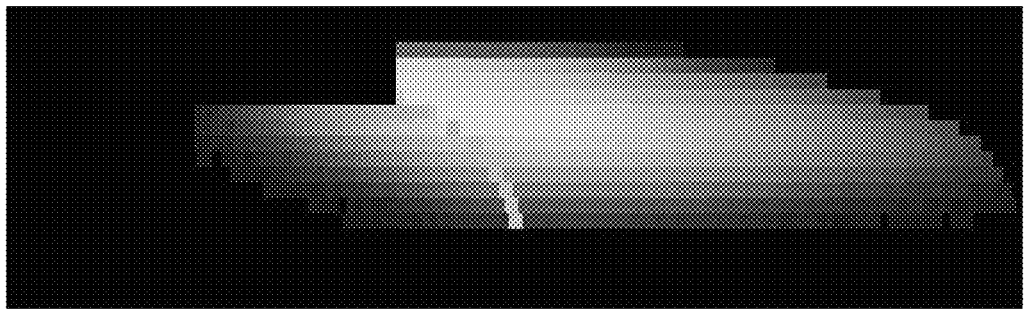
Fig. 10
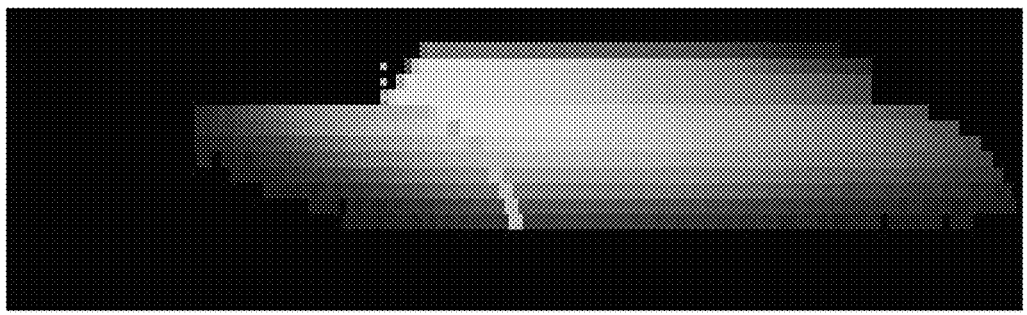
Fig. 11

METHOD FOR CONTROLLING A LIGHT PATTERN AND AUTOMOTIVE LIGHTING DEVICE

TECHNICAL FIELD

This invention is related to the field of automotive lighting devices, and more particularly, to the way light patterns are managed when using a Dynamic Bending Light (DBL) functionality.

BACKGROUND OF THE INVENTION

Dynamic Bending Lights are increasingly present in current automotive lighting devices, becoming an upgrade to standard headlights and designed to make driving at night easier and safer.

To implement such a lighting functionality, there have been many solutions intended to provide a light pattern in the direction of the movement of the vehicle when it is entering a curve.

Mechanic-based solutions turn the lighting source as the steering wheel does, by means of an angular movement converter which directly uses the turning of the steering wheel to induce a turning in the lighting source. The lights will turn in whatever direction the wheel does, and this range of motion allows the lights to illuminate the road even when taking sharp turns or turning quickly.

This solution has received a huge number of improvements, so that the turning of the light source is more effective and also takes into account different driving circumstances.

BRIEF SUMMARY OF THE INVENTION

An alternative solution for this problem is sought.

The invention provides an alternative solution for this problem by a method for controlling a light pattern provided by an automotive lighting device of an automotive vehicle, wherein the light pattern is provided by a matrix arrangement of light pixels, the method comprising the steps of
  providing a road profile;
  extracting road features from the road profile,
  dividing the matrix arrangement in row groups;
  assigning a different shifting value for each row group, each shifting value depending on the road features;
  dividing each row group in a first portion and a second portion;
  shifting the operation of the first portion of each row group of light sources according to the corresponding shifting value
  create a third portion between the shifted first portion and the second portion of each row group.

This method provides a controlled light pattern which includes a Dynamic Bending Light functionality, provided by the same lighting device that provides, for example, the low beam functionality, without moving parts and also being able to adapt to other driving circumstances, such as the driving speed or the presence of cars in the opposite direction.

The main advantage is that the lighting is more focused on the road than in other general approaches, which rely on the position of the steering wheel. In this case, the road profile is provided by other means, so that the method may achieve a predictive behavior, thus improving the visibility of the road with time enough to react.

The shifting in the operation should be understood as displacing one or more pixels within a row group to the right or to the left, depending on the shifting value: if the original pattern in one row is, e.g., 0-0-1-1-0, where 0 is a light turned off and 1 is a light turned on, after a 1 shift to the left, the resulting pattern would be 0-1-1-0-0, and after a 1 shift to the right, the resulting pattern would be 0-0-0-1-1. The subsequent creation of a third portion should be understood as the activation of the light sources which are associated to the blank spaces created when shifting the first portion. In another example, if the original pattern is 0-0-1-1-1-0-0-0-0-0, and the second portion is defined as 0-0-1 and the first portion is defined as 1-1-0-0-0-0, and the turning of the vehicle involves shifting 2 columns to the right, the second portion would remain the same 0-0-1, but the first portion would shift 2 columns to the right, creating 2 columns of blank space: 0-0-1-1-0-0-0. The creation of a third portion between the first portion and the second portion would "fill this blank space", so that the final light pattern, after joining the first portion, the second portion and the third portion would be 0-0-1-1-1-1-1-0-0-0. The first "1" would belong to the second portion, the next two "1"s would belong to the third portion and the remaining two "1"s would belong to the first portion, which has been shifted to the right.

The way of "filling" this third portion depends on the light pattern and the decisions of the car manufacturer.

In some particular embodiments, the light pixels are provided by solid-state light sources.

The term "solid state" refers to light emitted by solid-state electroluminescence, which uses semiconductors to convert electricity into light. Compared to incandescent lighting, solid state lighting creates visible light with reduced heat generation and less energy dissipation. The typically small mass of a solid-state electronic lighting device provides for greater resistance to shock and vibration compared to brittle glass tubes/bulbs and long, thin filament wires. They also eliminate filament evaporation, potentially increasing the life span of the illumination device. Some examples of these types of lighting comprise semiconductor light-emitting diodes (LEDs), organic light-emitting diodes (OLED), or polymer light-emitting diodes (PLED) as sources of illumination rather than electrical filaments, plasma or gas.

In some particular embodiments, each row group corresponds to only one row of the matrix arrangement of light pixels.

A finer tuning of the final light pattern is achieved when the number of row groups is higher, i.e., when each row group contains the minimum possible number of rows.

In some particular embodiments, the method further comprises the step of applying a correction in the luminous intensity of the light emitted by the light pixels.

In some light patterns, where the homogeneity of the beam is not enough to compensate the change in the light provided by the matrix arrangement, the intensity of some of the light sources may need to be corrected.

In some particular embodiments, the correction comprises a final mask configured to avoid glaring, which comprises dimming or turning off some of the shifted light pixels.

In these embodiments, the correction is not aimed to compensate the total flux, or to improve the homogeneity to the final beam, but to avoid glaring other vehicles. When rows are shifted, there is a possibility that the final light pattern projects some light on an opposite lane. A final mask to dim or turn off these pixels projecting light on the opposite lane is advantageous to avoid glaring.

In some particular embodiments, the road features are road points, each road point being characterized by a distance from the lighting device and an angle from the lighting device, and the shifting values are calculated using the distance and angle of the road points.

A simple way of implementing this invention is to capture a plurality of road points, and then calculating each shifting value using the position of these points, so that the shape of the road has a direct impact on the shifting pattern of the light pattern.

In some particular embodiments, each shifting value is calculated using the distance and angle of at least one road point.

An optimal way of achieving this transformation is assigning one road point to each row group. Since each row group is characterized by a distance between the lighting device and the light projected by this row group, the road point corresponding to this distance will provide an angle value. This angle value may be directly converted into a number of shifting positions for this row group.

The matrix of solid-state light sources may have many different angular resolutions. Depending on the number and arrangement of these light sources, resolution may vary from 0.01° per light source up to 0.5° per light source. Hence, the angle value of the road point may be translated in a different number of columns of the light array, depending on the density of these light sources in the array arrangement.

In some particular embodiments, the third portion of each row group is an interpolation between one boundary pixel of the first portion and one boundary pixel of the second portion.

When each row group of the original light pattern is divided into two portions, the first portion has a boundary pixel and the second portion has a boundary pixel. These two boundary pixels are adjacent before shifting the first portion, but when the first portion is shifted, the third portion created between them is contained between these two boundary pixels. Each boundary pixel has a value, and a sensible option is to provide the third portion with an interpolation between these two values. In some particular embodiments, the interpolation is linear.

In some particular embodiments, the light pattern is a low beam pattern and the first portion comprises the cut-off of the low beam pattern.

The cut-off is a diagonal line of the low beam pattern, and its shape is important in automotive regulations. The fact that this cut-off belongs to the first portion means that this cut-off is being shifted when the first portion is shifted. This is advantageous since the shifted pattern must also comply with the regulations. However, the invention may be also applied to other lighting functionalities without a cut-off, such as the high beam.

In some particular embodiments, the step of providing a road profile is carried out by using images of a camera. In some particular embodiments, the step of providing a road profile is carried out by using a global positioning system.

A camera is useful to provide the road profile, and a global positioning system is also helpful to complete the information provided by the camera.

In some particular embodiments, the light pixels of the image pattern are grey scale pixels, and more particularly, the luminous intensity of each pixel is according to a scale from 0 to 255.

Light modules usually define the light pattern on a grey scale, where the luminous intensity is graded from 0 to 255. This is a way of quantifying the light pattern so that it becomes able to be converted into light data, and then transmitted and managed by the control unit of the vehicle.

In a further inventive aspect, the invention provides an automotive lighting device comprising
a matrix arrangement of solid-state light sources, intended to provide a light pattern;
road profile acquisition means; and
a control unit for accomplishing the steps of the method according to the first inventive aspect.

This automotive lighting device is configured to provide a Dynamic Bending Light functionality without moving parts, and using elements which are already available, but with a new configuration.

In some particular embodiments, the matrix arrangement comprises at least 2000 solid-state light sources.

This invention can be useful for many types of lighting matrix/array-based technology, from the simplest one, with only a few thousands light sources, to more advanced one, with several hundred thousand one.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures:

FIGS. 7 and 8 show a different study case, in the event that the bend was to the right.

FIG. 9 shows the effect of this shifting in a more realistic light pattern.

FIG. 10 shows a first variation of the light pattern of FIG. 9.

FIG. 11 shows a second variation of the light pattern of FIG. 9.

DETAILED DESCRIPTION OF THE INVENTION

Figure 1:
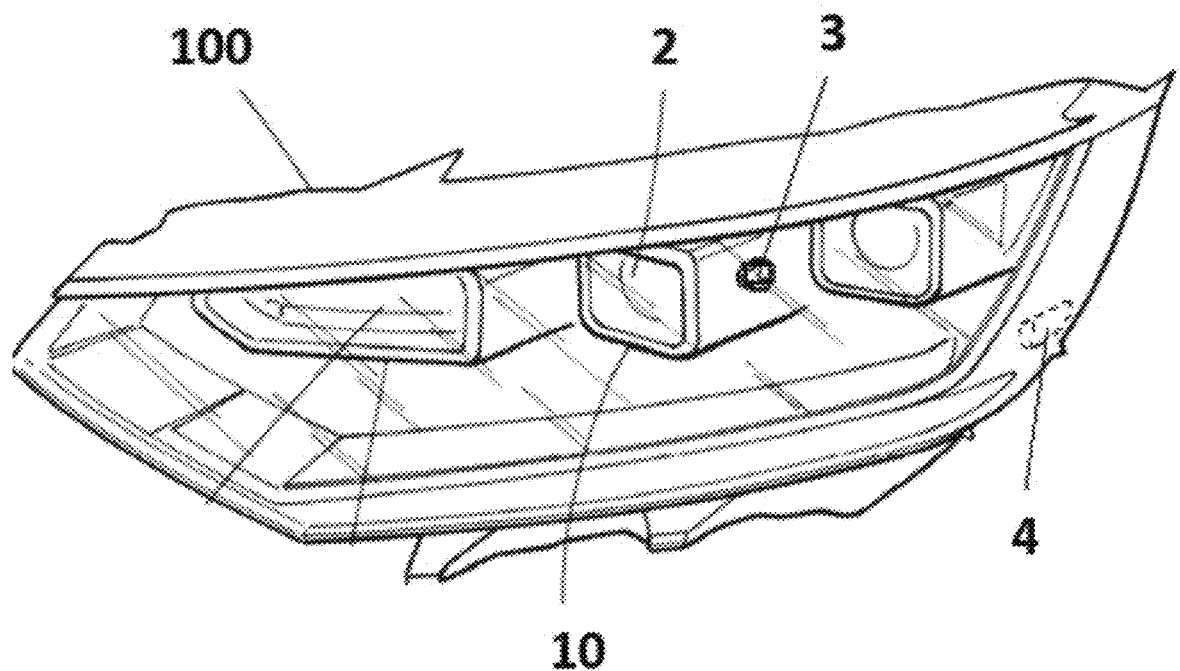
FIG. 1 shows a general perspective view of an automotive lighting device according to the invention.

Elements of the example embodiments are consistently denoted by the same reference numerals throughout the drawings and detailed description where appropriate:

1 Light pattern
2 LED
3 Control center
4 Camera
5 Row of light pattern
51 First portion of a row
52 Second portion of a row
53 Central portion of a row
6 Cut-off zone
7 Blank spaces
8 Boundary pixels
10 Lighting device
100 Automotive vehicle The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included.

FIG. 1 shows a general perspective view of an automotive lighting device 10 according to the invention.

This lighting device 10 comprises a matrix arrangement of LEDs 2 and a control center 3 which is configured to control the operation of these groups of LEDs. The control center 3 is configured to modify the configuration of the LEDs 2 when the steering wheel of the vehicle is activated.

Further, this lighting device 10 comprises a camera 4 to obtain images from the road ahead, to obtain a road profile.

This matrix configuration is a high-resolution module, having a resolution greater than 1000 pixels. However, no restriction is attached to the technology used for producing the projection modules.

A first example of this matrix configuration comprises a monolithic source. This monolithic source comprises a matrix of monolithic electroluminescent elements arranged in several columns by several rows. In a monolithic matrix, the electroluminescent elements can be grown from a common substrate and are electrically connected to be selectively activatable either individually or by a subset of electroluminescent elements. The substrate may be predominantly made of a semiconductor material. The substrate may comprise one or more other materials, for example non-semiconductors (metals and insulators). Thus, each electroluminescent element/group can form a light pixel and can therefore emit light when its/their material is supplied with electricity. The configuration of such a monolithic matrix allows the arrangement of selectively activatable pixels very close to each other, compared to conventional light-emitting diodes intended to be soldered to printed circuit boards. The monolithic matrix may comprise electroluminescent elements whose main dimension of height, measured perpendicularly to the common substrate, is substantially equal to one micrometer.

The monolithic matrix is coupled to the control center so as to control the generation and/or the projection of a pixilated light beam by the matrix arrangement. The control center is thus able to individually control the light emission of each pixel of the matrix arrangement.

Alternatively to what has been presented above, the matrix arrangement may comprise a main light source coupled to a matrix of mirrors. Thus, the pixelated light source is formed by the assembly of at least one main light source formed of at least one light emitting diode emitting light and an array of optoelectronic elements, for example a matrix of micro-mirrors, also known by the acronym DMD, for "Digital Micro-mirror Device", which directs the light rays from the main light source by reflection to a projection optical element. Where appropriate, an auxiliary optical element can collect the rays of at least one light source to focus and direct them to the surface of the micro-mirror array.

Each micro-mirror can pivot between two fixed positions, a first position in which the light rays are reflected towards the projection optical element, and a second position in which the light rays are reflected in a different direction from the projection optical element. The two fixed positions are oriented in the same manner for all the micro-mirrors and form, with respect to a reference plane supporting the matrix of micro-mirrors, a characteristic angle of the matrix of micro-mirrors defined in its specifications. Such an angle is generally less than 20° and may be usually about 12°. Thus, each micro-mirror reflecting a part of the light beams which are incident on the matrix of micro-mirrors forms an elementary emitter of the pixelated light source. The actuation and control of the change of position of the mirrors for selectively activating this elementary emitter to emit or not an elementary light beam is controlled by the control center.

In different embodiments, the matrix arrangement may comprise a scanning laser system wherein a laser light source emits a laser beam towards a scanning element which is configured to explore the surface of a wavelength converter with the laser beam. An image of this surface is captured by the projection optical element.

The exploration of the scanning element may be performed at a speed sufficiently high so that the human eye does not perceive any displacement in the projected image.

The synchronized control of the ignition of the laser source and the scanning movement of the beam makes it possible to generate a matrix of elementary emitters that can be activated selectively at the surface of the wavelength converter element. The scanning means may be a mobile micro-mirror for scanning the surface of the wavelength converter element by reflection of the laser beam. The micro-mirrors mentioned as scanning means are for example MEMS type, for "Micro-Electro-Mechanical Systems". However, the invention is not limited to such a scanning means and can use other kinds of scanning means, such as a series of mirrors arranged on a rotating element, the rotation of the element causing a scanning of the transmission surface by the laser beam.

In another variant, the light source may be complex and include both at least one segment of light elements, such as light emitting diodes, and a surface portion of a monolithic light source.

Figure 2:
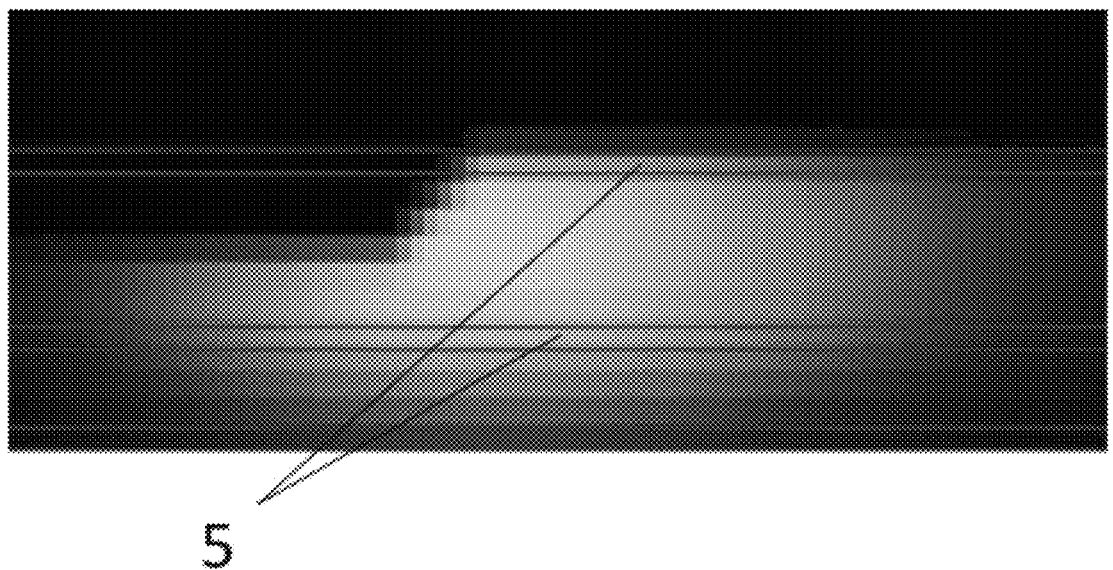
FIG. 2 shows some steps of a method according to the invention.

FIG. 2 shows some steps of a method according to the invention.

This figure shows a low beam light pattern 1 in an initial stage. This low beam is divided into row groups 5, each row group containing a row of pixels.

Each light pixel 3 of this image pattern 1 is characterized by a number according to a scale from 0 to 255, wherein 0 corresponds to no light and 255 corresponds to maximum luminous intensity.

Figure 3:
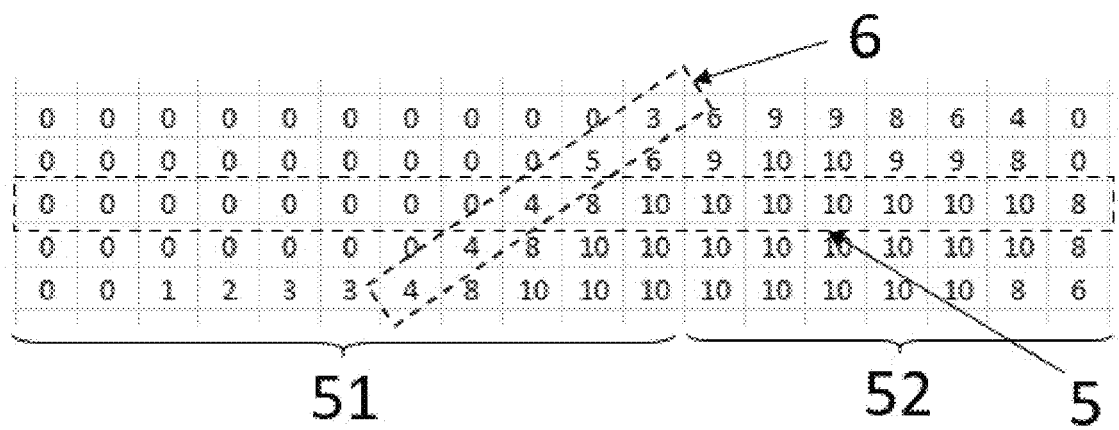
FIG. 3 shows a portion of a pixel matrix, which is the numeric correspondence to a light pattern similar to the one of FIG. 2.

FIG. 3 shows a portion of a pixel matrix, which is the numeric correspondence to a light pattern like the one of FIG. 2. Each light pixel of this image pattern 1 is characterized by a number according to a scale. Usual matrices use a scale from 0 to 255, wherein 0 corresponds to no light and 255 corresponds to maximum luminous intensity.

In this image, the pixels are divided into row patterns 5. Each pattern comprises a string of data, with numbers between 0 and 10, depending on the luminous intensity of the associated pixels. Obviously, the numeric values of these pixels are a simplified example, merely chosen for the sake of a better understanding of the invention, they do not correspond to the luminous intensity of the light pattern of FIG. 2.

The matrix arrangement provides the resolution in terms of distance and angle. For example, in a matrix arrangement of 100 rows and 240 columns, which is able to project light at 100 metres and cover an angle of 120°, each row covers a distance which is proportional to the height of the module and to the tangent of the vertical angle covered by the corresponding row, and each column covers an angle of 0.5° further from the preceding column.

Since this example could not cover such a great amount of pixels, for the sake of clarity, the matrix of FIG. 3 contains 5 rows and 18 columns. Although this is not completely realistic, each row will be considered to cover a constant distance of 10 m and each column will be considered to cover a constant angle of 5°. Intensity values are only comprised between 0 and 10.

Despite the pattern of this figure does not correspond to a low beam pattern, a zone 6 which is analogue to the cut-off is represented, with the diagonal set of values which separate the dark portion from the luminous portion.

Since this particular example is going to simulate a bend to the left, the first portion 51, which is going to be shifted, is the left one, and contains the cut-off portion 6. The second portion 52 is the remainder of the light pattern.

Figure 4:
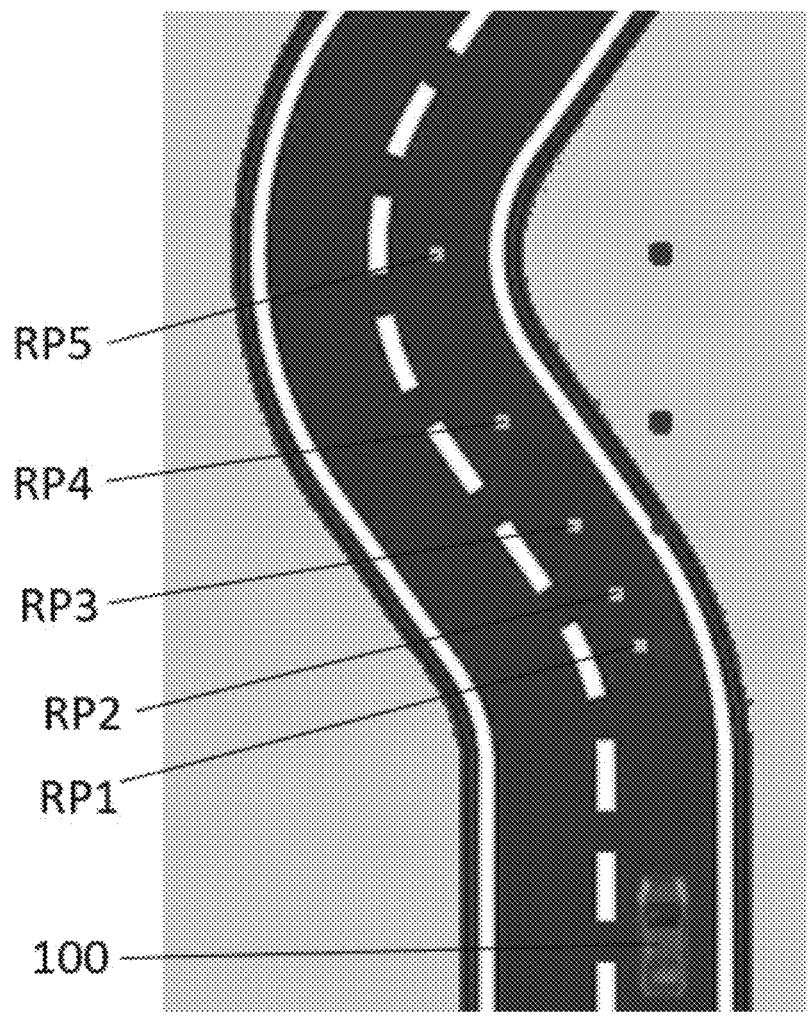
FIG. 4 shows further steps of a method according to the invention.

FIG. 4 shows further steps of the method.

In this figure, the road, as acquired from the camera and/or the GPS system, is shown. Some road points RP1, RP2, RP3, RP4, RP5 are calculated at the center point of the lane, at different distances. The distances will depend on the row groups of the matrix arrangement. To continue with the example of FIG. 3, road points are selected at 10 m, 20 m, 30 m, 40 m and 50 m.

Each road point will define a deviation angle with respect to the main direction of the lighting device. These angles may be easily calculated from the 2D distances to the lighting device. Hence, each road point is characterized by a distance and an angle.

For example, road point 1 RP1, corresponding to a distance of 10 m, has an angle of 5°; the road point 2 RP2, corresponding to a distance of 20 m, has an angle of 10°, the road point 3 RP3, corresponding to a distance of 30 m, has an angle of 20°, the road point 4 RP4, corresponding to a distance of 40 m, has an angle of 35° and the road point 5 RP5, corresponding to a distance of 50 m, has an angle of 40°.

With these values, the shifting value for row 1 would be 1 pixel, the shifting value for row 2 would be 2 pixel, the shifting value for row 3 would be 4 pixel, the shifting value for row 4 would be 7 pixel and the shifting value for row 5 would be 8 pixel.

Figure 5:
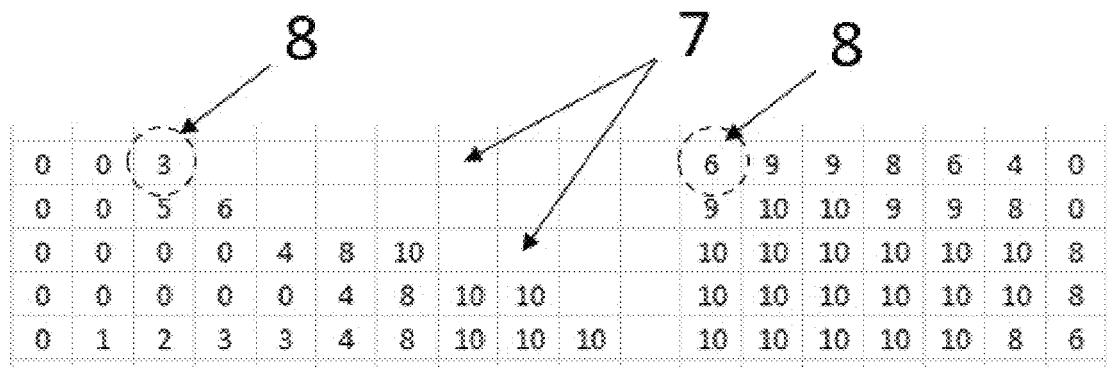
FIG. 5 shows the matrix of FIG. 3 corrected with some shifting values, according to some steps of a method according to the invention.

FIG. 5 shows the matrix of FIG. 3 corrected with these shifting values. Each row has been shifted to the left according to the corresponding shifting value, so that the modified light pattern is obtained.

However, this shifting operation leaves a blank space 7 in each row. This blank space is different in each row, since each row has a different shifting value.

This blank space is comprised between two boundary pixels 8 of each row. One boundary pixel corresponds to the last pixel of the first portion of each row, and the other boundary pixel corresponds to the last pixel of the second portion of each row. Between these boundary pixels 8, the blank space appears, and this blank space is intended to be filled by the third portion in each row.

Figure 6:
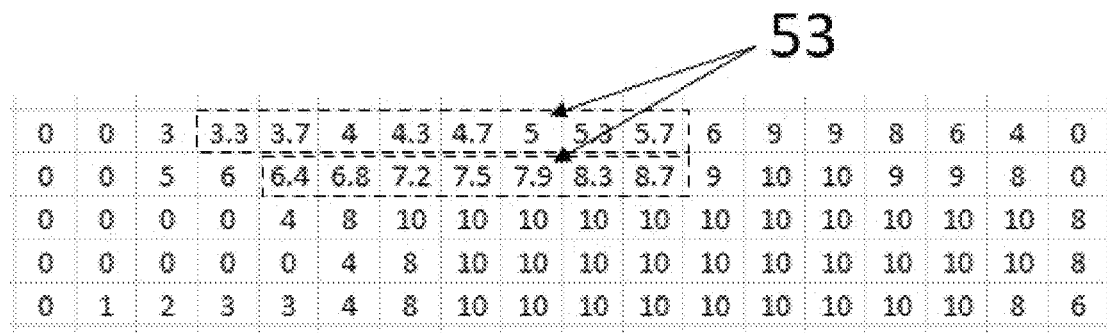
FIG. 6 shows the completed version of the light pattern of FIG. 5, with a linear interpolation between the boundary pixels of each row.

FIG. 6 shows the "completed" version of this light pattern, with a linear interpolation between the boundary pixels of each row.

In the upper row, the distance of eight blank pixels 7 between the boundary pixels 8, shown in FIG. 5, is filled with the third portion 53 in each row. This third portion 53 is calculated as a linear interpolation between the intensity value of the left boundary pixel and the intensity value of the right boundary pixel.

Figure 7:
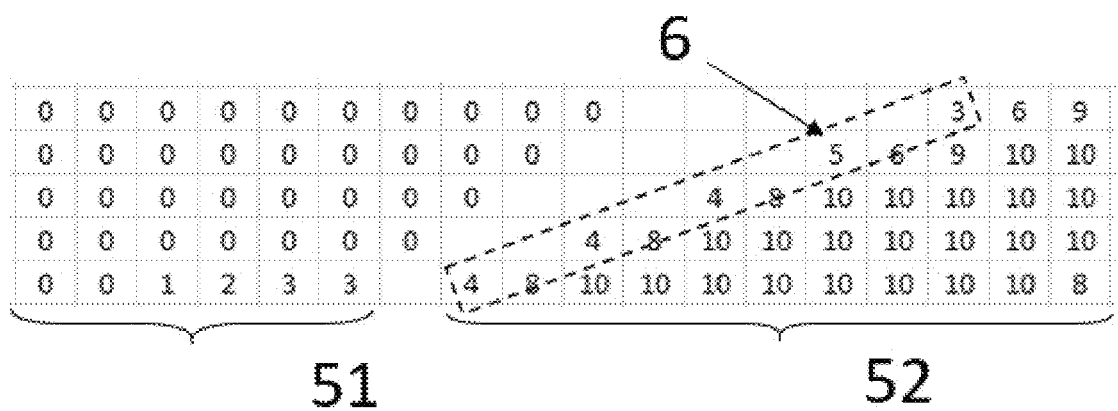

FIGS. 7 and 8 show a different study case, in the event that the bend was to the right.

For this case, the division between the first portion and the second portion in each row is different, because now the cut-off is located in the right portion, which becomes the first portion, which is the portion to be shifted.

As exemplary values, the shifting value for row 1 would be 1 pixel, the shifting value for row 2 would be 2 pixels, the shifting value for row 3 would be 3 pixels, the shifting value for row 4 would be 3 pixels and the shifting value for row 5 would be 5 pixels.

With these values, FIG. 7 shows, the same as FIG. 5, some blank spaces, which become the third portion in this case. These blank spaces are filled in FIG. 8 with a linear interpolation between the boundary pixels.

FIG. 9 shows the effect of this shifting in a more realistic light pattern. The first portion of each row is shifted according to a different value, so the final light pattern has a better adaptation to the road than the ones provided by current methods.

However, as may be seen in this image, the upper part of the light pattern may be projecting some light on the opposite lane. To provide a remedy for this problem, the present invention provides different options.

First one, shown in FIG. 10, involves the combination of the present invention with Adaptive Driving Beam functionality, so that a dark mask is applied over the portion which is to be projected over a vehicle, to avoid glaring at it. In simpler embodiments, this mask would be merely configured to avoid light projection on the opposite lane.

FIG. 11 illustrates a second option, where the upper part of the light pattern is considered, and therefore shifted, as a single row.

With this option, the kink shape is preserved, so that the opposite lane is not invaded by the deformed shape obtained in other embodiments of the method.

The lower part of the image would be divided into rows, as explained in the examples above, but the upper part, containing the kink of the low beam pattern, would be considered as a single row, so that the shifting values for all the rows comprised in this global row would be the same.

What is claimed is:

1. A method for controlling a light pattern provided by an automotive lighting device of an automotive vehicle, wherein the light pattern is provided by a matrix arrangement of light pixels, the method comprising:
providing a road profile;
extracting road features from the road profile, with the road features being road points, with each road point being characterized by a distance from the lighting device and an angle from the lighting device, dividing the matrix arrangement in row groups;

assigning a different shifting value for each row group, each shifting value calculated using the distance and angle of at least one road point;

dividing each row group in a first portion and a second portion;

shifting the operation of the first portion of each row group of light sources according to the corresponding shifting value; and generating a third portion between the shifted first portion and the second portion of each row group.

2. The method according to claim 1, wherein each row group corresponds to only one row of the matrix arrangement of light pixels.

3. The method according to claim 1, further comprising applying a correction in the luminous intensity of the light emitted by the light pixels.

4. The method according to claim 3, wherein the correction includes a final mask configured to avoid glaring by dimming or turning off some of the shifted light pixels.

5. The method according to claim 1, wherein the third portion of each row group is an interpolation between one boundary pixel of the first portion and one boundary pixel of the second portion.

6. The method according to claim 5, wherein the interpolation is linear.

7. The method according to claim 1, wherein the light pattern is a low beam pattern and the first portion includes a cut-off of the low beam pattern.

8. The method according to claim 1, wherein providing a road profile is carried out by using images of a camera.

9. The method according to claim 1, wherein providing a road profile is carried out by using a global positioning system.

10. The method according to claim 1, wherein the light pixels of the image pattern are grey scale pixels.

11. The method of claim 10, wherein the luminous intensity of each of the grey scale pixels is according to a scale from 0 to 255.

12. An automotive lighting device comprising:
a matrix arrangement of solid-state light sources, intended to provide a light pattern;
road profile acquisition means; and
a control unit configure to:
provide a road profile;
extract road features from the road profile, with the road features being road points, with each road point being characterized by a distance from the lighting device and an angle from the lighting device,
divide the matrix arrangement in row groups;
assign a different shifting value for each row group, each shifting value calculated using the distance and angle of at least one road point;
divide each row group in a first portion and a second portion;
shift the operation of the first portion of each row group of light sources according to the corresponding shifting value; and
generate a third portion between the shifted first portion and the second portion of each row group.

13. The automotive lighting device according to claim 12, wherein the matrix arrangement comprises at least 2000 solid-state light sources.

* * * * *